(12) United States Patent
Spiro et al.

(10) Patent No.: US 6,655,080 B2
(45) Date of Patent: Dec. 2, 2003

(54) INSECT TRAPPING APPARATUS WITH LAMINAR AIR FLOW

(75) Inventors: Matthew Spiro, Lake Mary, FL (US); Robert W. J. Weiss, Orlando, FL (US)

(73) Assignee: Lentek International, Inc., Orlando, FL (US)

( * ) Notice: Subject to any disclaimer, the term of this patent is extended or adjusted under 35 U.S.C. 154(b) by 0 days.

(21) Appl. No.: 10/078,239

(22) Filed: Feb. 19, 2002

(65) Prior Publication Data

US 2003/0154645 A1 Aug. 21, 2003

(51) Int. Cl.⁷ .............................. A01M 1/08; A01M 1/02
(52) U.S. Cl. ................................ 43/139; 43/113; 43/107
(58) Field of Search ......................... 43/139, 113, 112, 43/107, 132.1

(56) References Cited

U.S. PATENT DOCUMENTS

| | | | | |
|---|---|---|---|---|
| 1,807,550 A | * | 5/1931 | Rector | 43/139 |
| 2,694,879 A | * | 11/1954 | Stoll | 43/139 |
| 3,196,577 A | | 7/1965 | Plunkett | 43/139 |
| 3,201,893 A | * | 8/1965 | Gesmar | 43/139 |
| 4,168,591 A | | 9/1979 | Shaw | 43/114 |
| 4,282,673 A | * | 8/1981 | Focks et al. | 43/139 |
| 4,519,776 A | | 5/1985 | DeYoreo et al. | 431/328 |
| 4,788,789 A | * | 12/1988 | Boobar et al. | 43/113 |
| 4,891,904 A | | 1/1990 | Tabita | 43/112 |
| 4,962,611 A | * | 10/1990 | Millard | 43/112 |
| 4,979,330 A | * | 12/1990 | Rorant | 43/139 |
| 5,123,201 A | | 6/1992 | Reiter | 43/107 |
| 5,126,369 A | | 6/1992 | Wilson et al. | 514/459 |
| 5,157,865 A | * | 10/1992 | Chang | 43/113 |
| 5,167,090 A | | 12/1992 | Cody | 43/139 |
| 5,205,064 A | | 4/1993 | Nolen | 43/112 |
| 5,205,065 A | * | 4/1993 | Wilson et al. | 43/113 |
| 5,228,233 A | * | 7/1993 | Butler et al. | 43/113 |
| 5,241,779 A | * | 9/1993 | Lee | 43/139 |
| 5,281,621 A | | 1/1994 | Wilson et al. | 514/459 |
| 5,301,458 A | | 4/1994 | Deyoreo et al. | 43/139 |
| 5,327,675 A | | 7/1994 | Butler et al. | 43/113 |
| 5,329,725 A | | 7/1994 | Bible | 43/113 |
| 5,382,422 A | | 1/1995 | Dieguez et al. | 424/45 |
| 5,394,643 A | | 3/1995 | Schmittmann | 43/124 |
| 5,417,009 A | | 5/1995 | Butler et al. | 43/113 |
| 5,424,551 A | | 6/1995 | Callahan | 250/493.1 |
| 5,501,033 A | | 3/1996 | Wefler | 43/131 |
| 5,528,049 A | | 6/1996 | Callahan | 250/493.1 |
| 5,576,011 A | | 11/1996 | Butler et al. | 424/411 |
| 5,595,018 A | | 1/1997 | Wilbanks | 43/112 |
| 5,647,164 A | | 7/1997 | Yates | 43/139 |
| 5,657,576 A | | 8/1997 | Nicosia | 43/132.1 |
| 5,669,176 A | | 9/1997 | Miller | 43/139 |
| 5,676,960 A | | 10/1997 | Myles | 424/410 |
| 5,683,687 A | | 11/1997 | Marin et al. | 424/84 |
| 5,799,436 A | | 9/1998 | Nolen et al. | 43/112 |
| 5,813,166 A | | 9/1998 | Wigton et al. | 43/107 |
| 5,915,950 A | | 6/1999 | Kleinhenz | 43/139 |
| 5,943,815 A | | 8/1999 | Paganessi et al. | 43/107 |
| 5,983,557 A | | 11/1999 | Perich et al. | 43/107 |
| 6,032,406 A | | 3/2000 | Howse et al. | 43/114 |

(List continued on next page.)

*Primary Examiner*—Darren W. Ark
(74) *Attorney, Agent, or Firm*—Allen, Dyer, Doppelt, Milbrath & Gilchrist, P.A.

(57) ABSTRACT

An apparatus and method for trapping insects, such as mosquitos, is disclosed. A gas source emits a gas for attracting insects. An insect trap barrel assembly is spaced from the gas source and includes a cylindrically configured housing having an outer wall surface. An air intake wall is spaced from the outer wall surface and defines an annular configured air inflow channel. A fan assembly is mounted within the housing and communicates with the air inflow channel and draws outside air into the housing and traps insects that are drawn into the housing with the inflow of air. The air intake wall is dimensioned and spaced from the outer wall such that the inflow of air into the inflow channel creates a substantially laminar flow of air along the outer wall surface of the housing.

7 Claims, 12 Drawing Sheets

U.S. PATENT DOCUMENTS

| | | | |
|---|---|---|---|
| 6,033,212 A * | 3/2000 | Bonnema et al. | 43/1 |
| 6,050,025 A | 4/2000 | Wilbanks | 43/112 |
| 6,055,766 A | 5/2000 | Nolen et al. | 43/112 |
| 6,088,949 A | 7/2000 | Nicosia et al. | 43/107 |
| 6,106,821 A | 8/2000 | Baker et al. | 424/84 |
| 6,145,243 A | 11/2000 | Wigton et al. | 43/139 |
| 6,164,010 A | 12/2000 | Snell et al. | 43/131 |
| 6,185,861 B1 | 2/2001 | Perich et al. | 43/107 |
| 6,199,315 B1 | 3/2001 | Suzue et al. | 43/113 |
| 6,209,256 B1 | 4/2001 | Brittin et al. | 43/107 |
| 6,267,953 B1 | 7/2001 | Bernier et al. | 424/84 |
| 6,279,261 B1 | 8/2001 | Binker et al. | 43/125 |
| 6,286,249 B1 | 9/2001 | Miller et al. | 43/139 |
| 6,305,122 B1 | 10/2001 | Iwao et al. | 43/112 |
| 6,425,202 B1 | 7/2002 | Lin et al. | 43/107 |
| 6,647,215 * | 10/2002 | Nelson et al. | 43/107 |
| 6,516,559 B1 * | 2/2003 | Simchoni et al. | 43/107 |
| 6,530,172 B2 * | 3/2003 | Lenz | 43/112 |
| 6,568,123 B2 * | 5/2003 | Nelson et al. | 43/139 |
| 6,568,124 B1 * | 5/2003 | Wilbanks | 43/112 |
| 2003/0061757 A1 * | 4/2003 | Askin | 43/112 |
| 2003/0070345 A1 * | 4/2003 | Nolen et al. | 43/112 |
| 2003/0070346 A1 * | 4/2003 | Winner et al. | 43/112 |

* cited by examiner

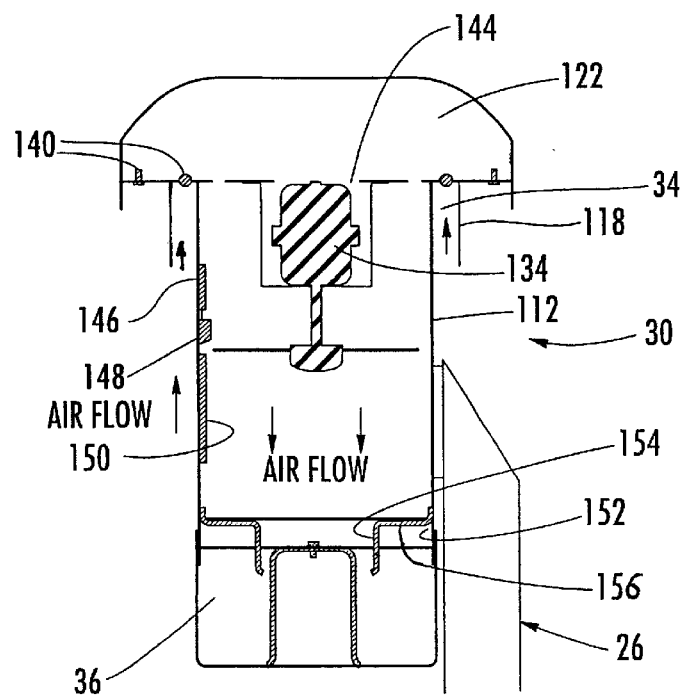
FIG. 7.
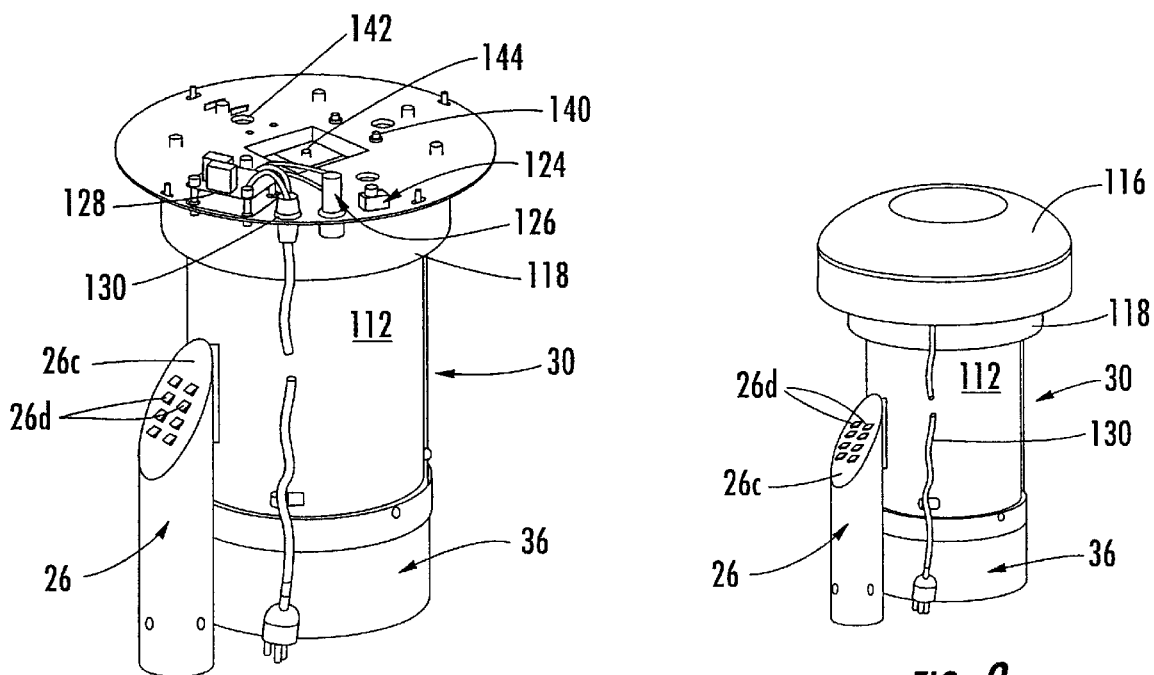
FIG. 8.
FIG. 9.

INSECT TRAPPING APPARATUS WITH LAMINAR AIR FLOW

FIELD OF THE INVENTION

This invention relates to the field of insect traps, and more particularly, this invention relates to a method and apparatus of attracting mosquitos and other biting insects.

BACKGROUND OF THE INVENTION

Insect traps, such as for trapping mosquitos and other biting insects, are commonly used in tropical areas and in locations where hot summer nights are conducive for mosquitos and other biting insects to proliferate. Some insect trapping devices include an insect attractant that attracts insects into the vicinity of an insect trap. The insect attractant could be a chemical similar to a hormone for attracting insects, or could be heat, moisture, gas or other insect attractants. Some of the prior art traps include an electrified grid that electrifies the insects when the insect engages the grid. The insect attractant would be surrounded by the grid such that when the insect is attracted by the insect attractant into the electrified grid, the insect is electrified and killed.

In yet other types of prior art insect traps, a fan is mounted in a housing and creates an inflow into an inflow channel where insects are sucked by the inflow of air into the housing and trapped in a mesh bag. Typically, to attract insects in close proximity to the housing and thus toward the inflow of air, carbon dioxide gas or other attractants are generated to attract the insects. An example of this type of device is disclosed in U.S. Pat. No. 6,145,243 to Wigton et al., where a self-contained gas source provides gas to a burner where $CO_2$ gas is produced upon combustion. A counterflow of air is provided for sucking insects into the counterflow of air as insects are attracted by the $CO_2$ gas.

Although this type of insect trapping device and other similar types of devices are advantageous, a counterflow of air could produce cooling of the exhaust gas, and could limit diffusion of the carbon dioxide. A counterflow of air could also condense any moisture, which is an attractant for insects, and especially mosquitos, and also aids in spreading the carbon dioxide gas. Also, this type of insect trapping device is self-contained as one integral unit. It is an expensive device because it uses self-contained electrical generation circuitry instead of a standard electrical outlet for power. Other prior art devices have similar drawbacks. Other prior art devices use one type of attractant instead of a combination of attractants that could be beneficial. Also, the use of a flexible mesh bag to trap insects is not advantageous because the mesh bag is subject to deterioration in an outdoor environment. In some prior art insect trapping designs, mosquitos are not killed adequately, allowing them to escape.

SUMMARY OF THE INVENTION

The present invention advantageously provides an insect trapping apparatus and method that overcomes the disadvantages of prior art insect traps. The insect trapping apparatus of the present invention simulates body temperature and a warm blooded animal breathing out carbon dioxide gas. In one aspect of the present invention, a hot carbon dioxide gas is emitted as an insect attractant. A heat signature is produced from the insect trap that is characteristic of a warm blooded animal and a blue light is emitted of a wavelength that attracts mosquitos into the insect trap. The blue light can be emitted from light emitting diodes mounted on the insect trap.

The insect trap comprises a housing, in one aspect of the present invention, and includes an inflow channel. Insects are drawn by an inflow of air into the inflow channel and into the housing where insects are trapped therein. In one aspect of the present invention, the housing comprises a substantially cylindrically configured trap barrel having an annular inflow channel around the trap barrel as formed by an air intake wall space from the outer wall surface of the trap barrel. A laminar air flow is drawn along the outer wall of the trap barrel in one preferred aspect of the invention. A hot carbon dioxide gas is also emitted as an attractant offset from the insect trap for minimizing the cooling of the hot carbon dioxide gas by any inflow of air into the insect trap. A hot carbon dioxide gas can also be emitted, together with moisture by burning a fuel such as propane.

In yet another aspect of the present invention, hot carbon dioxide gas and moisture are exhausted through a vertically extending exhaust tube to minimize cooling of the carbon dioxide gas and condensation of moisture. Insects are attracted through an inflow channel of an insect trap mounted offset from an exhaust tube to trap the insects therein.

The present invention also provides an improved catch cup that is not formed as a fabric or mesh bag, or similar flexible bag material used in prior art devices, which could tear or be difficult to empty. The catch cup has a double hinged trap door formed as a cover that automatically opens when the catch cup is inserted, and locked by twisting the catch cup onto the bottom portion of the trap barrel of the insect trap. A laminar air flow is also produced against the outer wall surface of the trap barrel.

The insect trapping apparatus also includes a unique support stand that can be secured in the ground by mounting stakes to provide a stable environment and operation, even in high winds. The unique configuration of the top helmet dome of the insect trap barrel and its stepped configuration with the air intake wall allows electrical components mounted on a printed circuit board shelf to be adequately protected from rain and exposure, while also providing for an air flow channel configuration that allows a laminar flow of air along the outer wall surface of the insect trap barrel and into the inflow channel.

The present invention also provides for the generation of a heat signature from the insect trap that corresponds to a heat signature of a warm blooded animal. The present invention uses an internal heater pad liner for insulation against a heater pad that is positioned against the inner wall surface of the insect trap. The internal heater pad liner acts as an insulated barrier for the heater pad and reduces the tendency of air blowing through the insect trap to cool the heater pad, while maintaining the outer wall surface of the trap barrel at about the desired temperature corresponding to the heat signature of a warm blooded animal. Thus, less heat is consumed, keeping the barrel at the desired temperature. A thermostat circuit produces temperature control over the heater pad.

BRIEF DESCRIPTION OF THE DRAWINGS

Other objects, features and advantages of the present invention will become apparent from the detailed description of the invention which follows, when considered in light of the accompanying drawings in which:

FIG. 7 is a fragmentary and partial sectional view of the insect trap barrel assembly.

FIG. 8 is an isometric view of the insect trap barrel assembly having its hood removed and showing the printed circuit board shelf.

FIG. 9 is another isometric view of the insect trap barrel assembly with its hood inserted and the barrel assembly mounted on the burner barrel exhaust tube.

DETAILED DESCRIPTION OF THE PREFERRED EMBODIMENTS

Figure 1:
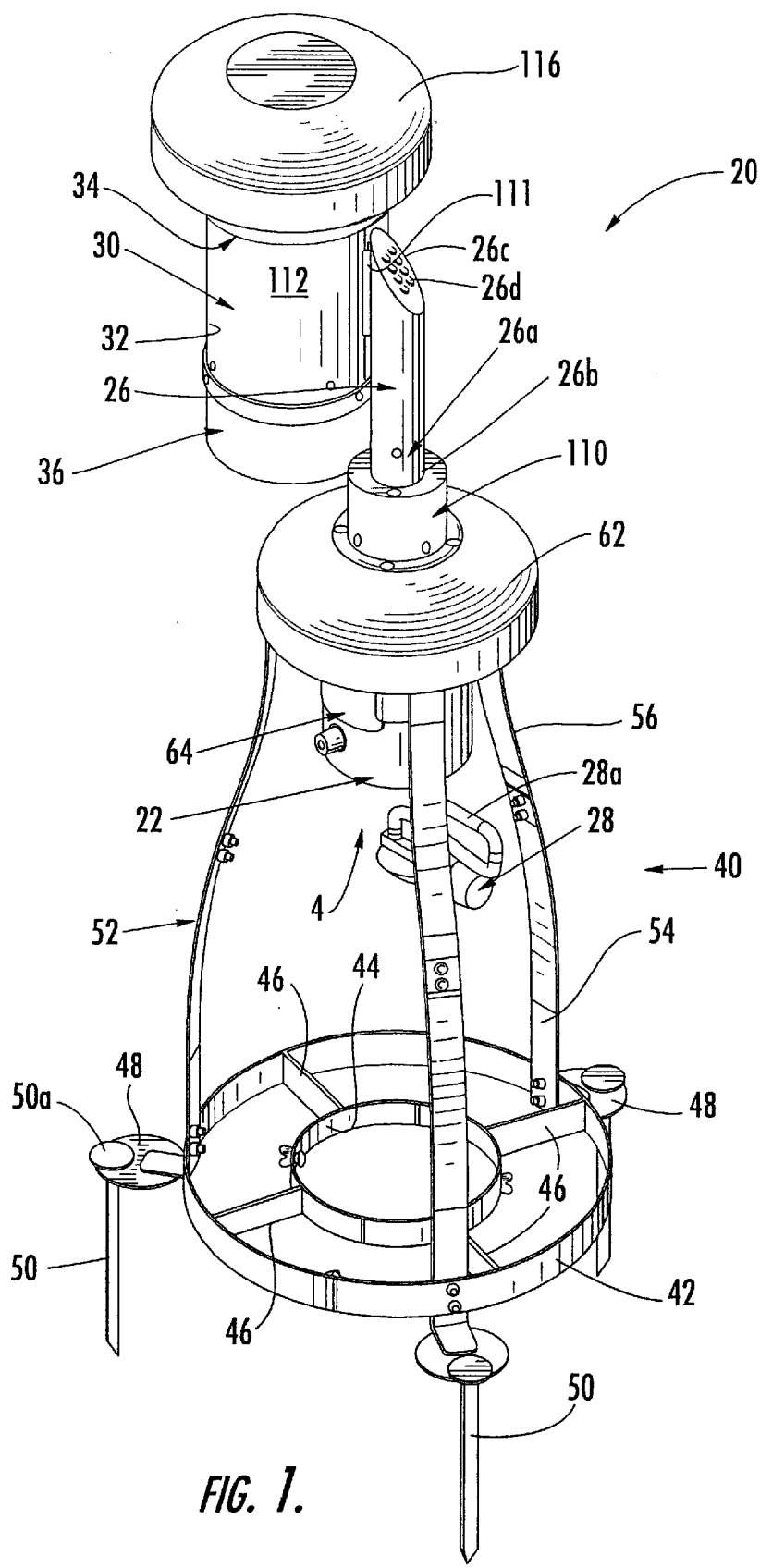
FIG. 1 is an isometric view of the insect trapping apparatus of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention provides an insect trapping apparatus that advantageously overcomes the disadvantages of prior art insect traps. The insect trapping apparatus simulates body temperature and a warm blooded animal breathing out carbon dioxide gas. It also includes at least one light emitting diode (LED) that generates blue light of a wavelength that attracts insects, especially mosquitos. An insect, such as a mosquito, is drawn by the carbon dioxide, the simulated body temperature, and the blue light into an inflow channel of an insect trap barrel assembly of the apparatus when the mosquito is attracted close to the inflow channel.

The present invention does not use a counterflow air system as in some prior art insect trapping devices. Instead, the insect trapping apparatus of the present invention uses a straight exhaust tube that extends from a burner assembly where gas, such as propane gas, is burned and catalyzed to produce carbon dioxide gas and some moisture. The straight exhaust tube does not cool the carbon dioxide exhaust to an extent that moisture is condensed on the side of an exhaust tube or quickly in the air, as often occurs in some counterflow devices. Also, the combination of carbon dioxide exhaust and moisture, heat from an insect trap barrel, and blue light emitted from the blue light emitting diodes (LED's), combine to attract insects, such as mosquitos, into the proximity of the insect trapping apparatus.

The mosquitos are sucked upward in a laminar flow of air along the outer wall surface of the insect trap barrel assembly, which in one aspect of the invention, is formed as a cylindrical housing or trap barrel member. The flow of air extends through the inflow channel and into a catch cup. The present invention also provides a two-piece design instead of a one-piece design as in the prior art. The burner assembly is contained in a separate burner barrel that is separate from the insect trap barrel assembly. The burner barrel is also positioned offset from the insect trap barrel assembly, allowing increased attractant in the form of carbon dioxide ($CO_2$) gas to be disbursed throughout the general environment surrounding the apparatus without cooling occurring from an inflow of air.

The present invention also provides a catch cup that is not formed as a fabric or mesh bag or other similar flexible bag that could tear or be difficult to clean and empty. The catch cup has a double hinged trap door as a covering that automatically opens when the catch cup is inserted onto the insect trap barrel assembly. The catch cup is locked into place on the insect trap barrel assembly by twisting the catch cup onto the bottom portion of the insect trap barrel assembly. A laminar air flow also is produced against the outer wall surface of the insect trap barrel.

The thermocouple and associated pressure regulator and control valve are operative together such that the control valve closes within 20 seconds of the burner flame going out. The design configuration of the thermocouple relative to the burner assembly is an advantageous improvement over prior art designs. The thermocouple extends near and slightly above the position of the flame, but does not engage the flame.

Additionally, the insect trapping apparatus includes a unique support stand that can be secured in the ground by mounting stakes to provide a stable environment and operation, even in high winds. The unique configuration of the top helmet dome resting on the insect trap barrel assembly and the stepped configuration with the air intake wall allows electrical components to be adequately protected from rain and exposure, while also providing for an inflow channel configuration that allows a laminar flow of air along the insect trap barrel assembly outer wall into the inflow channel.

The present invention also provides for the generation of a heat signature from the insect trap barrel assembly that corresponds to a heat signature of a warm blooded animal. The present invention uses an internal heater panel liner against a heater panel, which in turn, is positioned against the inner wall surface of the insect trap barrel assembly. The internal heater panel liner acts as an insulative barrier for the heater panel and reduces the tendency of air blowing through the insect trap barrel assembly to cool the heater panel, while maintaining the exterior wall surface of the insect trap barrel assembly at about the desired temperature corresponding to the heat signature of a warm blooded animal. The appropriate thermostat control circuit is included for temperature control of the heater panel. Power for the various components, such as the fan assembly, heater panel, blue light emitting diodes and other components is provided by a conventional AC power source and cord, in one preferred aspect of the present invention. Most major surfaces exposed to the elements can be zinc plated and then painted with epoxy or alkydresin outdoor paint to protect the apparatus from harsh outdoor elements.

FIG. 1 illustrates at 20 an isometric view of the insect trapping apparatus of the present invention. The apparatus 20 of the present invention includes a burner barrel 22 containing a burner assembly 24 (including a catalyst as explained below) (FIG. 10) having a carbon dioxide ($CO_2$) gas exhaust tube 26 that extends vertically upward. A gas supply valve assembly 28 connects to a propane tank (not shown) and receives gas from the propane tank. The burner assembly 24 burns the propane gas and exhausts the burned propane as carbon dioxide exhaust and some moisture through the straight exhaust tube 26. Although propane gas is preferred because it is readily available, other insect attractants could be used as suggested by those skilled in the art. Also, carbon dioxide could be supplied in a tank instead of being generated by burning. Dry ice could even be used in some applications as suggested by those skilled in the art.

Mounted on the top portion of the exhaust tube 26 is an insect trap barrel assembly 30, which generates a heat signature corresponding to the temperature of a warm blooded animal and draws air in a laminar air flow along the outer wall surface 32 and up into an inflow channel 34. The inflow of air is drawn into the interior of the insect trap barrel assembly, and into a catch cup 36 positioned on the bottom portion of the insect trap barrel assembly where insects, such as mosquitos, become trapped (FIG. 7). The insect trap barrel assembly includes blue LED lights that emit a blue light of wavelength to aid in attracting insects, such as mosquitos.

Referring now again to FIG. 1, there is illustrated the insect trapping apparatus 20 of the present invention and showing a support frame 40 formed from a lower ring member 42, such as formed from hot or cold rolled steel strip or other strong but similar material known to those skilled in the art. A central ring member 44 has four radiating support trusses 46 that interconnect to the lower ring member 42 to form a ground engaging platform. Three foot pads 48 are mounted equidistantly on the outer portion of the lower ring member 42 and receive mounting stakes 50 through the foot pads 48 and into the ground to hold the lower ring member 42 and central ring member 44 stable relative to the ground. Foot pads 48 include v-shaped openings (not shown) that receive, in one preferred design, a v-shaped mounting stake 50, which are designed to stay in the ground under adverse conditions. An enlarged cap 55a on the mounting stake 50 receives hammer or hand blows to allow the mounting stake to be hammered or pressed into the ground.

Figure 4:
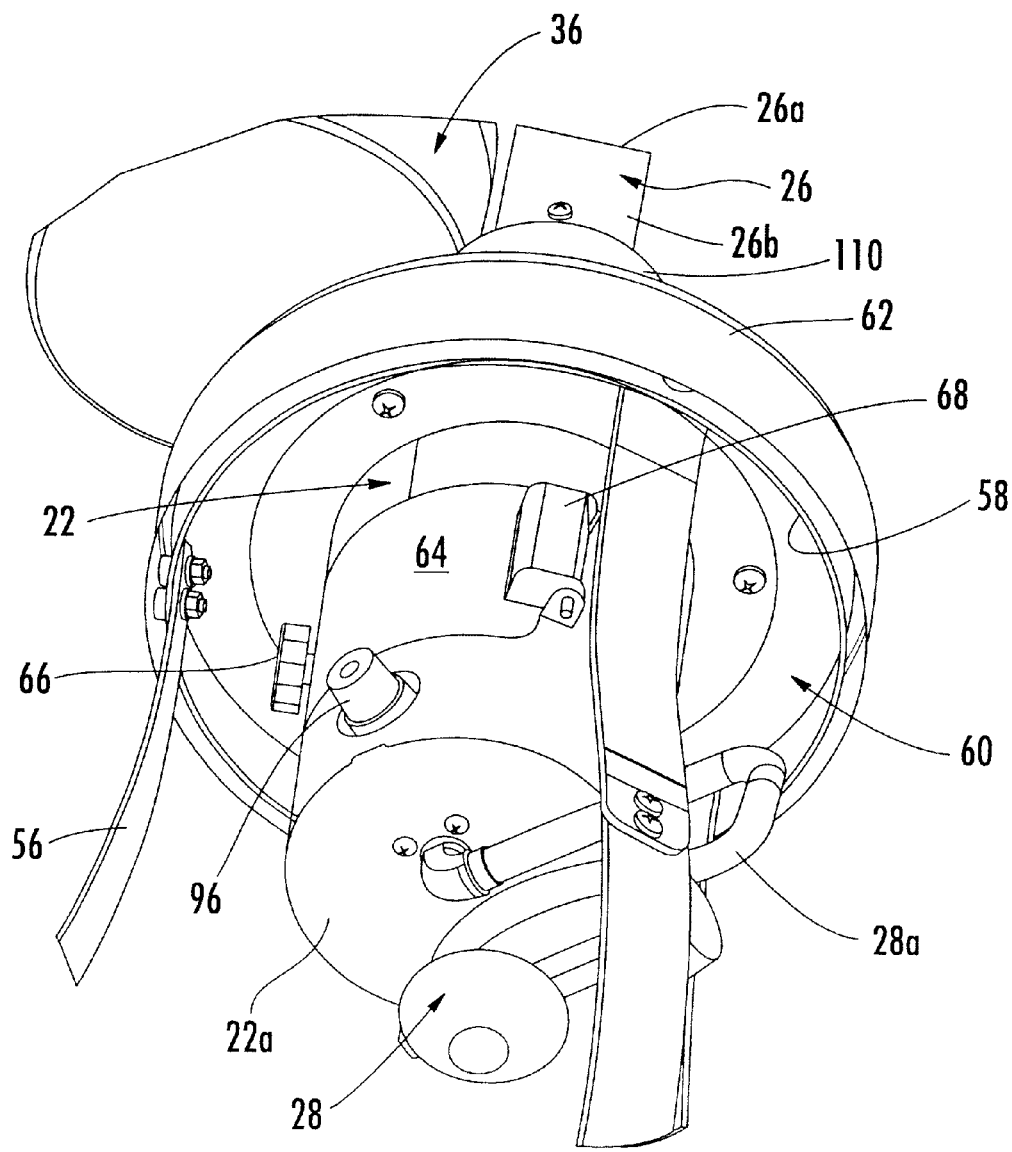
FIG. 4 is an isometric view looking at an angle toward the underside of the burner barrel and burner dome in the direction of arrow 4 in FIG. 1.

Three support legs 52 are mounted equidistantly on the lower ring member 42 and extend upward to support the burner barrel 22 and associated burner assembly 24. Each support leg 52 includes a lower leg member 54 that is secured by bolts or other means to the inside portion of the lower ring member 42 and an upper leg member 56 that receives an upper ring member 58 having an upper ring support 60 on which a burner dome 62 is mounted thereon (FIG. 4).

Figure 10:
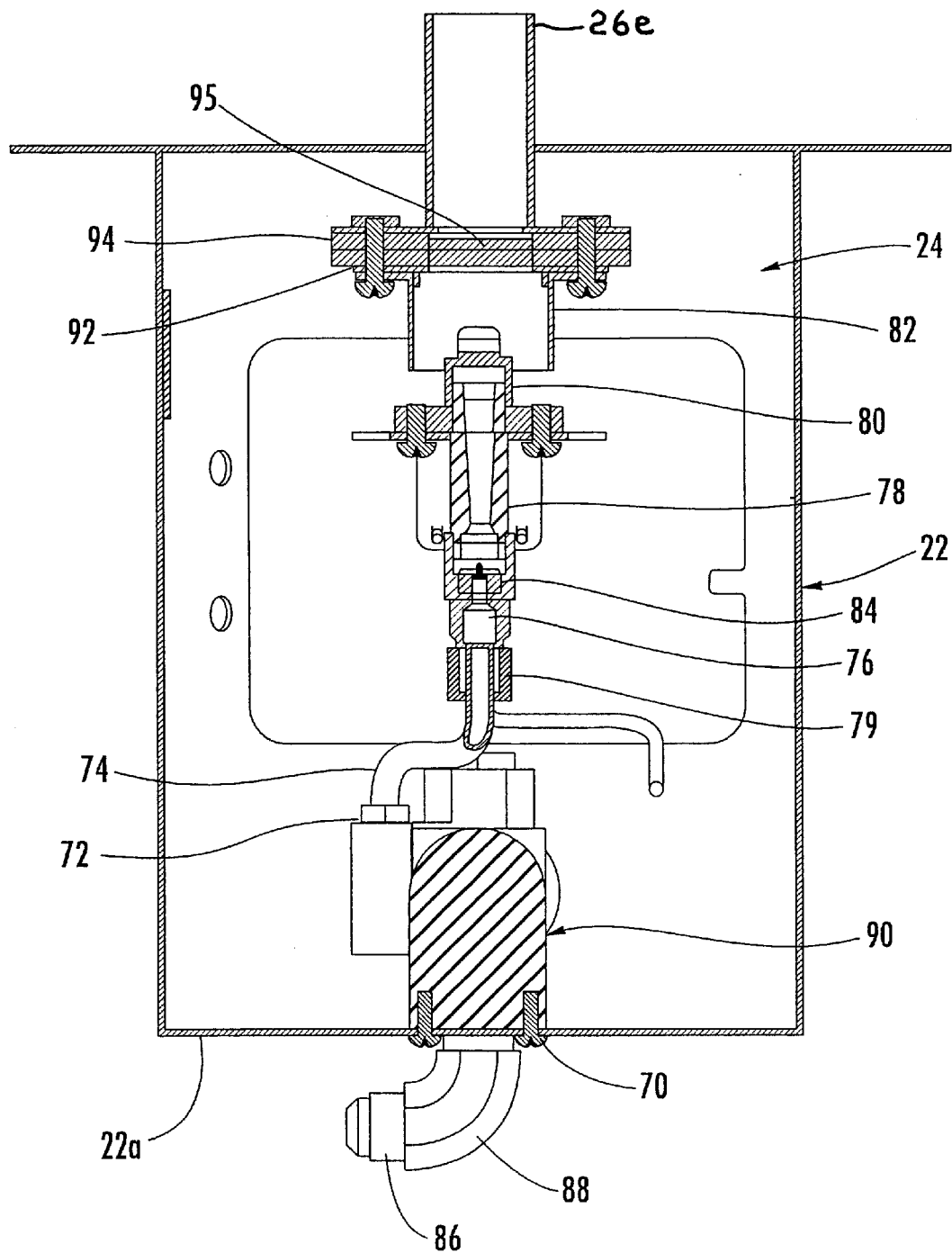
FIG. 10 is a fragmentary, partial sectional view of the burner barrel and burner assembly of the present invention.

As shown in greater detail in FIG. 10, the burner barrel 22 is formed as a cylindrically configured housing, such as formed from sheet metal or other similar sheet material, and includes a door 64, door knob 66 and door hinge 68, which are operative for allowing user access to the internal portions of the burner barrel. The burner assembly 24 is mounted in the burner barrel and includes a burner mount plate 70, which mounts a pressure regulator and control valve assembly 90 on the bottom support wall 22a of the burner barrel. A pilot fitting 72 and burner tube 74 connect the pressure regulator and control valve assembly 90 to an upper burner base 78 via a tube compression nut 79. The burner assembly 24 also includes an orifice 76 in the burner base 78 and a burner top 80 through which flame is discharged, and flame cover 82. An air inlet 84 is provided on part of the burner base, as known to those skilled in the art, to provide for air intake and permit combustion of propane or other gas used by the burner assembly.

Figure 11:
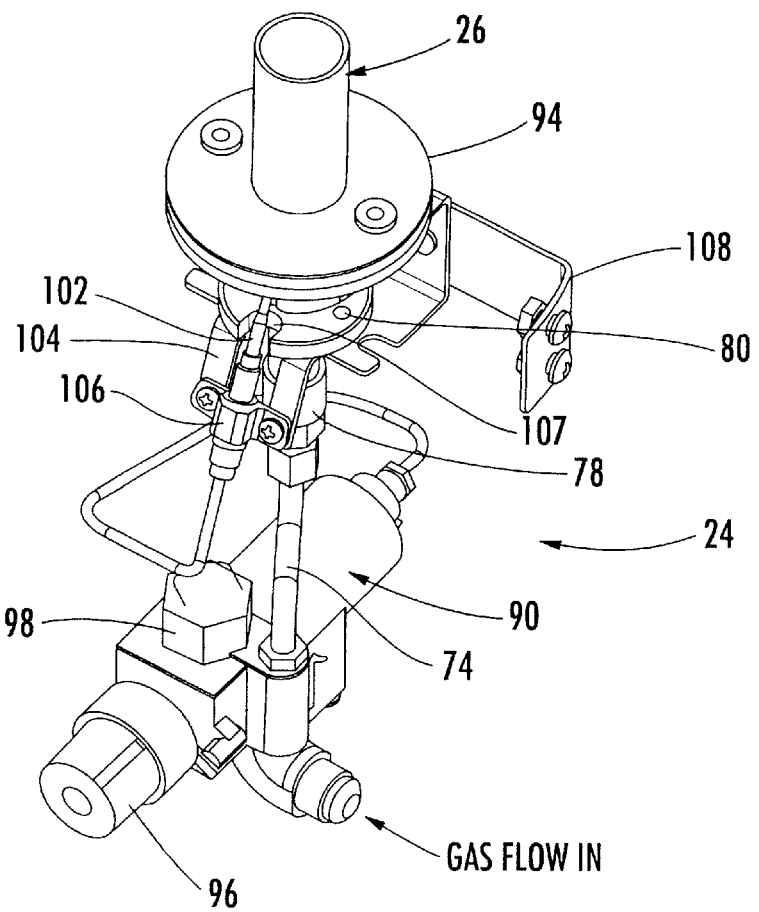
FIG. 11 is an isometric view of the burner assembly, including pressure regulator and control valve assembly of the present invention.

An adapter 86 is connected to the lower portion of the burner mount plate 70 and extends out from the bottom support wall 22a of the burner barrel 22. An elbow joint tube 88 is connected via gas supply pipe 28a to the gas supply valve assembly 28 and allows more room within the support frame 40 as defined by the support legs 52 for holding a propane or other gas tank (not shown), which in turn is connected to the gas supply valve assembly 28 (FIG. 11). A burner bracket 92 is mounted on the flame cover 82 and includes a catalyst flange support 94 that holds a catalyst 95 to catalyze unspent gas and byproducts that are the result of the burning of propane or other gas to produce the carbon dioxide. In one aspect of the present invention, the catalyst is a platinum coated ceramic formed in a honeycomb ceramic cell structure.

Figure 12:
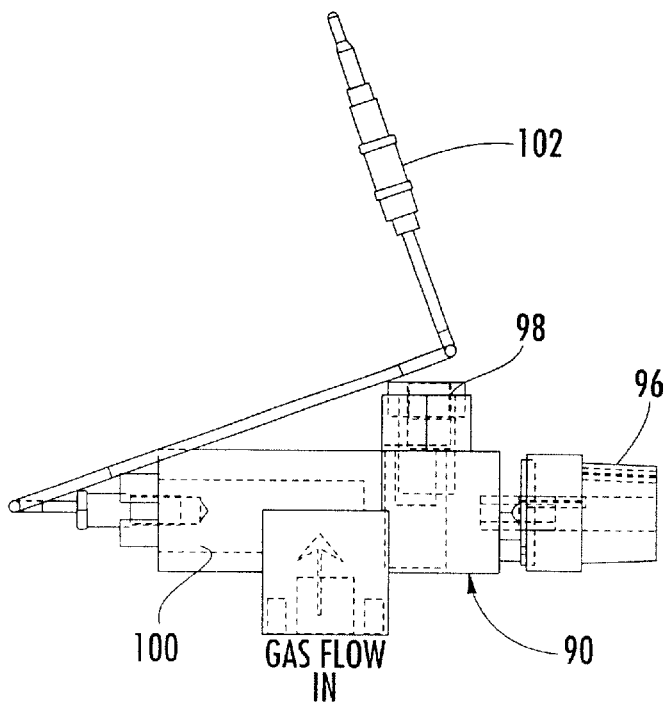
FIG. 12 is a fragmentary, partial sectional view of the pressure regulator and control valve assembly and associated thermocouple used in the present invention.

FIGS. 11 and 12 illustrate the pressure regulator and control valve assembly 90 and details of the burner assembly 24 of the present invention. The pressure regulator and control valve assembly 90 includes a valve knob 96, pipe plug adapter 98, and main valve body 100 that is operative with knob 96 to help in controlling the amount of propane gas which passes through the pressure regulator and control valve assembly 90 to be burned. A thermocouple 102 is operatively connected to the main valve body 100 and is operative for registering the amount of heat as temperature from the burning propane flame to the assembly and controlling on/off gas supply.

When the flame is shut off or extinguished by accident or on purpose, the thermocouple cools to an extent to shut off the pressure regulator and control valve assembly and cut off any propane gas flowing through the burner assembly 90. In one aspect of the invention, the valve assembly 90 closes (shuts down) gas flow within 20 seconds after the flame is discharged. The thermocouple 102 generates a small amount of electricity that is enough to hold the valve within the valve assembly 90 open. When the thermocouple grows cold, the valve in the control valve assembly "drops" and closes, i.e., shuts down gas flow to the burner assembly 24, as is well known to those skilled in the art.

Figure 13:
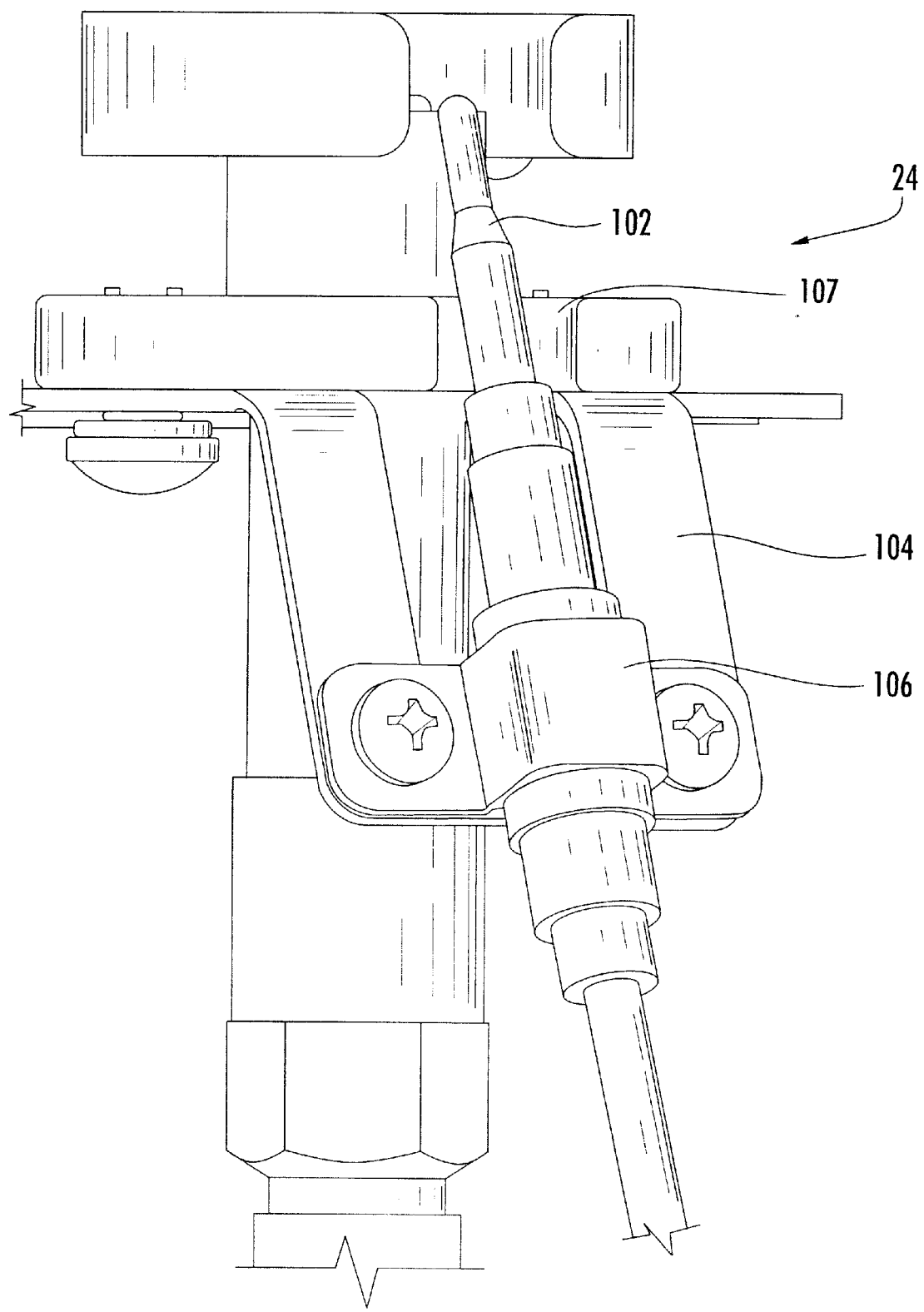
FIG. 13 is an enlarged isometric view showing the thermocouple positioned relative to the top portion of the burner assembly and the position of the thermocouple relative to a flame discharged from the burner assembly.

FIG. 13 illustrates the mounting of the thermocouple 102 relative to the burner base 78 and burner top 80 such that the thermocouple is positioned about two millimeters away from the flame. The top of the thermocouple 102 does not extend into the flame, but rises just above the top base of the burner assembly. The thermocouple 102 is mounted on a thermocouple support bracket 104 and secured by a thermocouple clip 106 and extends through a formed groove 107 in the burner base as illustrated in FIG. 11. The burner assembly 24 is supported by a burner bracket support 108 mounted to the inside wall of the burner barrel 22.

Figure 2:
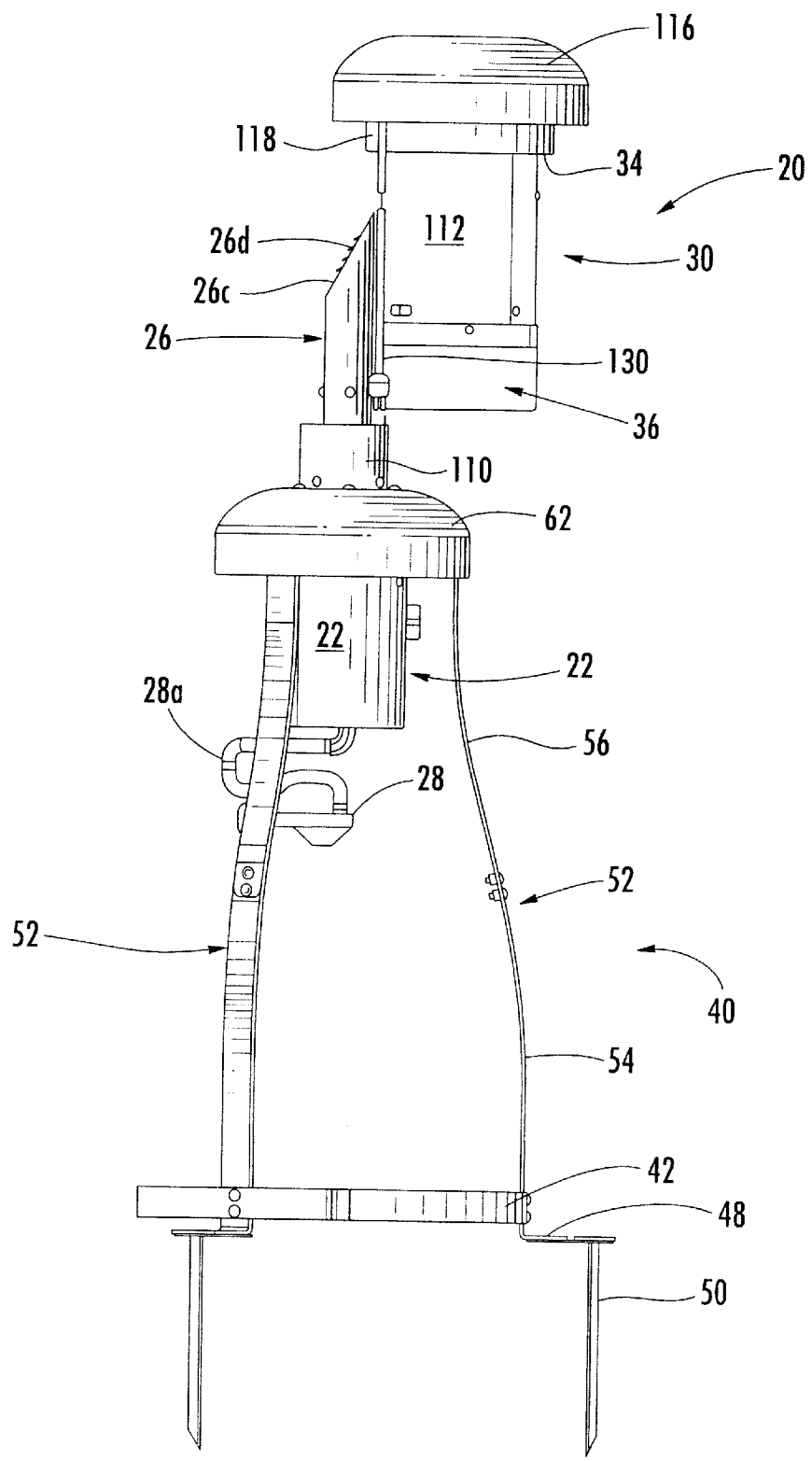
FIG. 2 is a right side elevation view of the insect trapping apparatus shown in FIG. 1.
Figure 3:
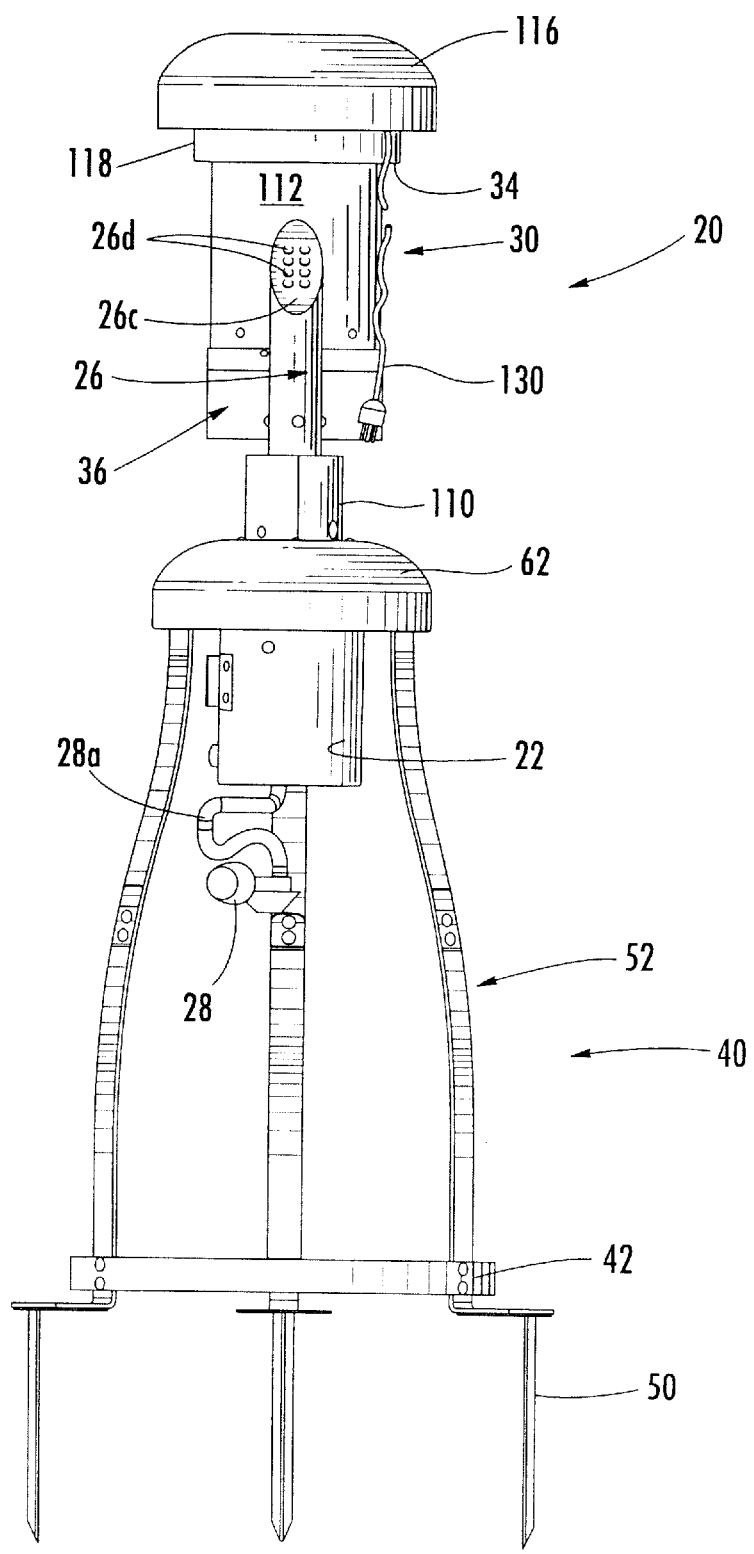
FIG. 3 is a front elevation view of the insect trapping apparatus shown in FIG. 1.

As illustrated in FIGS. 10 and 11, the exhaust tube 26 extends vertically from the catalyst assembly and includes a top exhaust tube 26a (FIGS. 1–3) having a coupling joint 26b and an upper end plate 26c that is angled relative to the vertical, axial direction of the tube. The end plate 26c includes heat vents 26d to allow discharge of the hot $CO_2$ gas in a direction lateral from the exhaust tube and away from the insect trap barrel assembly and any inflow of air into the insect trap barrel assembly. The coupling joint of the top exhaust tube couples over a lower exhaust tube 26e extending from the catalyst assembly. Although not necessary, a heat shroud 110 could be included.

Figure 14:
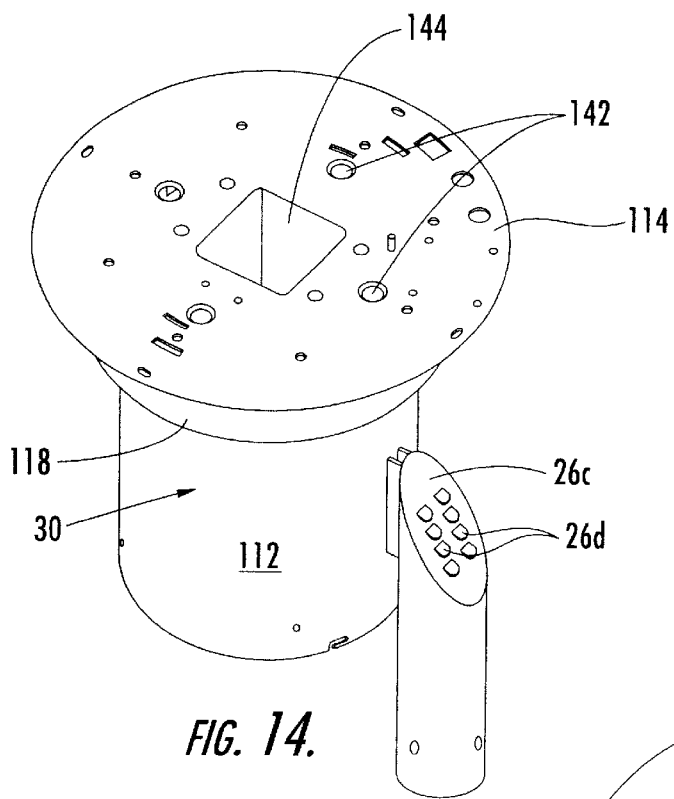
FIG. 14 is an isometric view of the insect trap barrel assembly with the hood removed and showing the insect trap barrel assembly mounted on the exhaust tube.
Figure 15:
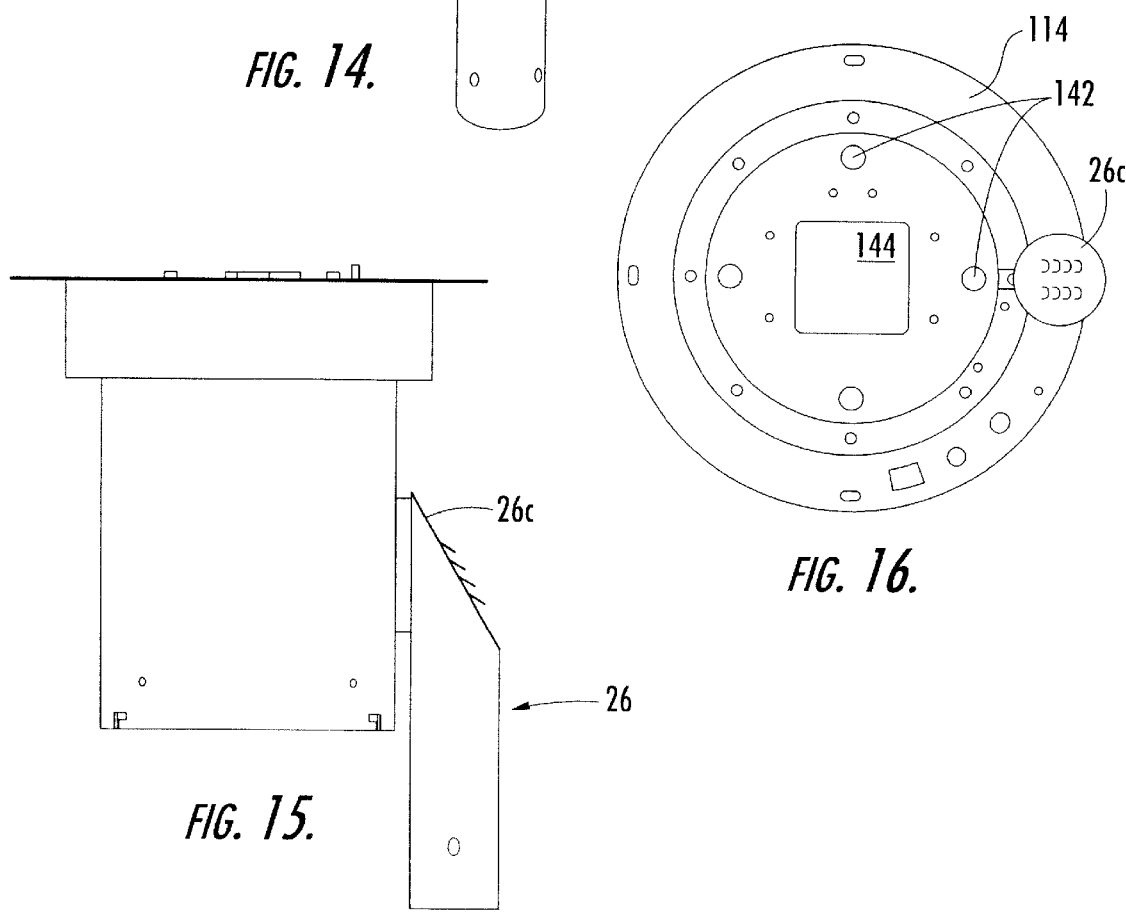
FIG. 15 is a fragmentary side elevation view of the insect trap barrel assembly of FIG. 14 mounted on the exhaust tube and showing the amount of lateral offset between the exhaust tube and insect trap barrel assembly.
Figure 17:
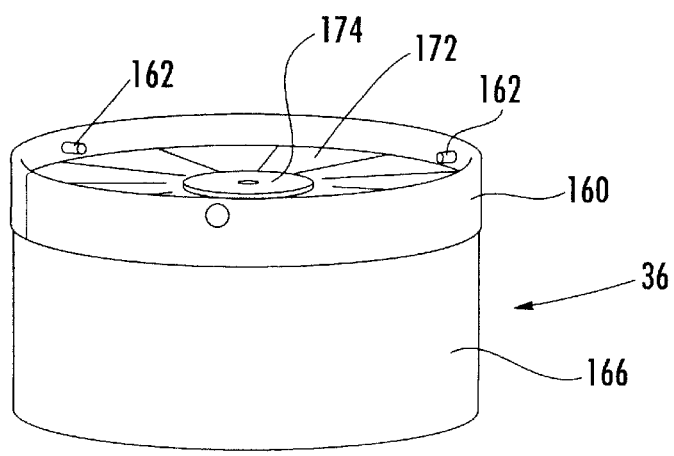
FIG. 17 is an isometric view of the catch cup used in the present invention.
Figure 18:
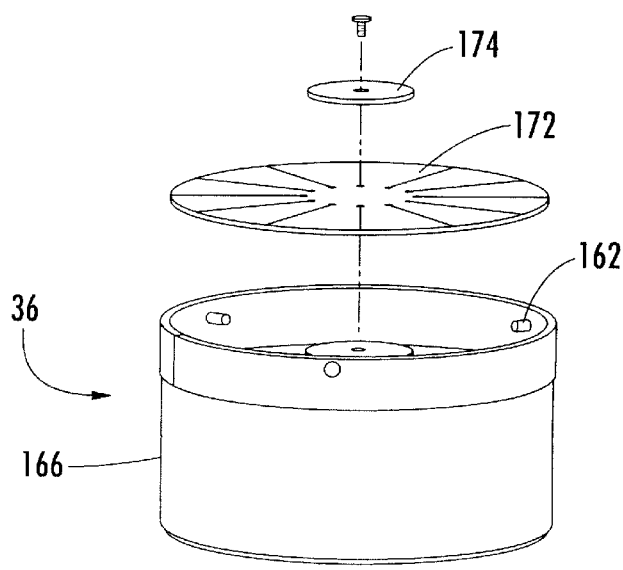
FIG. 18 is an exploded isometric view of the catch cup and showing the double hinged trap door and door disk used in the catch cup.
Figure 19:
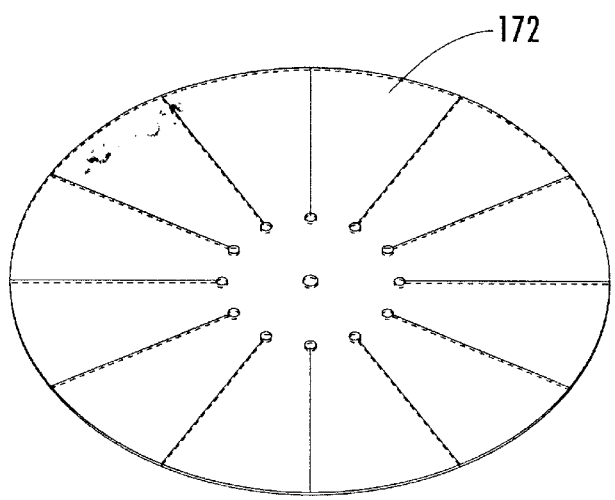
FIG. 19 is an isometric view of the double hinged trap door used with the catch cup of the present invention.

As illustrated, the insect trap barrel assembly 30 is mounted offset from the exhaust tube 26 by an exhaust offset support 111 as shown in FIGS. 14–15. The insect trap barrel assembly 30 includes a cylindrically configured top barrel member 112 that supports a printed circuit board (PCB) shelf 114 and top hood (or helmet dome) 116. The top hood (or helmet dome) 116 includes an arcuate top surface and annular configured hood ring member as best illustrated in FIGS. 1–3, 6 and 7. An air intake wall 118 is cylindrically configured and extends around the upper portion of the top barrel member 112 and under the printed circuit board shelf 114 to form an annular inflow channel 34. Air passes in a laminar fashion along the outer exterior wall of the insect trap barrel assembly formed by the top barrel member and up into the annular inflow channel 34. The air flow passes down through the center portion of the trap barrel assembly as drawn by a fan assembly 120. The spacing of the air intake wall 118 from the top barrel member 112 and the length of the air intake wall relative to the configuration of the top barrel member is such that a laminar air flow is produced along the outer wall surface of the top barrel member.

The hood (or helmet dome) 116 extends over the printed circuit board shelf 114 and forms an open interior zone 122 between the printed circuit board shelf 114 and the top interior portion of the hood or helmet dome to allow electronic components, such as a power switch 124, fuse 126 and electronic components, including any transformers on printed circuit board 128, and other components to be mounted on the printed circuit board shelf 114. The top hood, i.e., helmet dome 116, has its hood ring member spaced sufficiently from the air intake wall, and formed to be in stepped configuration, as shown in FIG. 7, to permit a user to place their hands underneath and turn on and off the switches. A power cord 130 extends along the outside surface of the insect trap barrel assembly 30 and is wired to the electronic components on the printed circuit board and other components mounted on the printed circuit board shelf. A transformer and other appropriate circuitry are mounted on the printed circuit board 128 or printed circuit board shelf 114 to convert AC household current to the appropriate voltages and currents required by all components. The hood or helmet dome 116 is secured to the printed circuit board shelf by fastening means as known to those skilled in the art. A small amount of air is allowed to be drawn through the helmet to ensure that the electronic components remain dry in moist atmospheric conditions.

Figure 6:
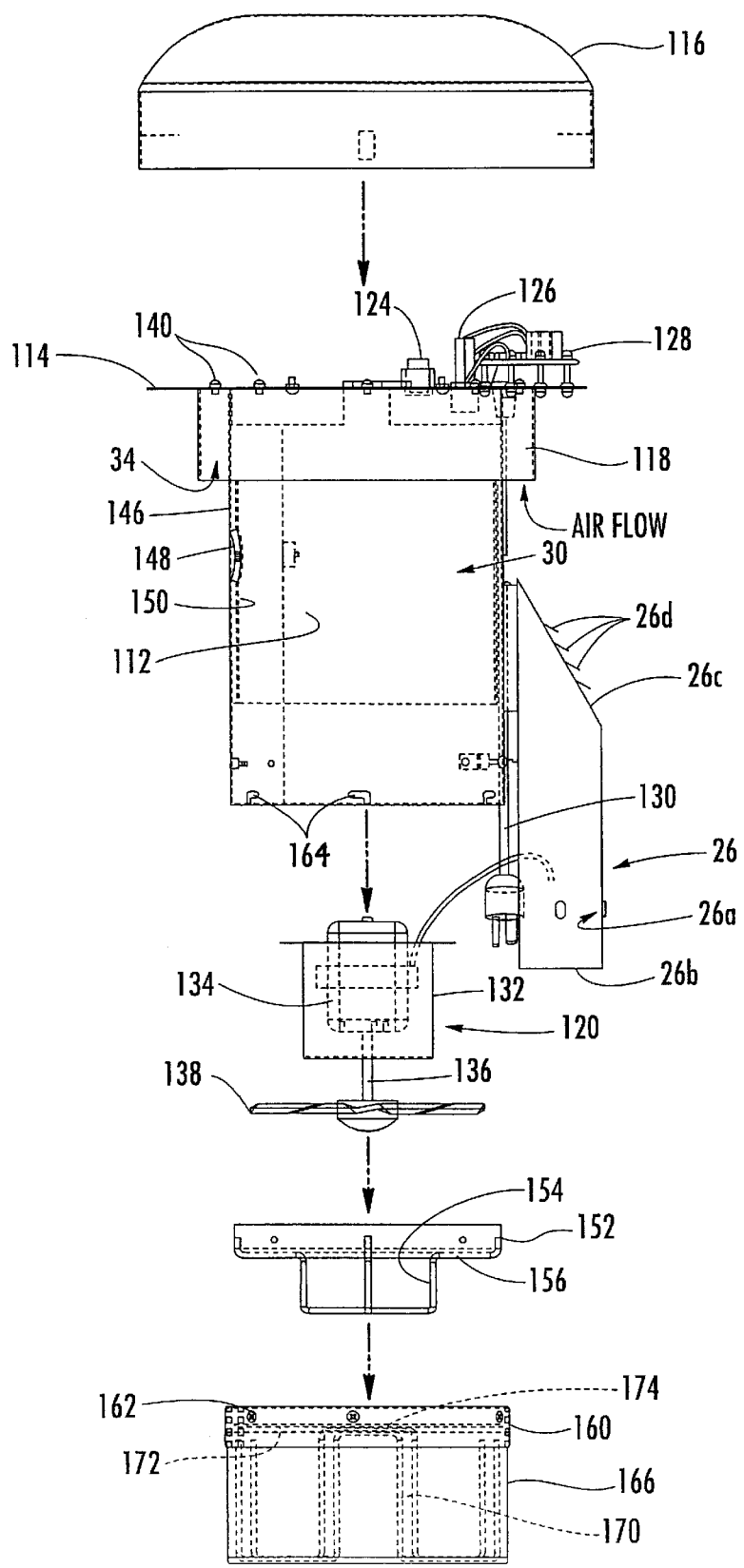
FIG. 6 is an exploded and partial sectional view in elevation of the insect trap barrel assembly and associated details, including the fan assembly and catch cup.

As illustrated best in FIGS. 6 and 7, a fan bracket 132 is mounted to the underside of the printed circuit board shelf 114 and supports the motor fan assembly 120, having a fan motor 134, an output shaft 136 that extends through the fan bracket and supports on the output shaft 136 a fan 138.

Blue LED lights 140 are mounted on the printed circuit board shelf 114 and powered by the appropriate electronic circuit components mounted on the printed circuit board shelf 114. When the hood or helmet dome 116 is mounted over the printed circuit board shelf, the blue LED lights give off a blue glow under the helmet dome, which together with the heat signature, aids in attracting insects, such as mosquitos, to the immediate vicinity of the inflow channel of the insect trap barrel assembly. The attracted mosquitos are sucked by the laminar air flow into the annular inflow channel defined by the air intake wall and upper portion of the top barrel. Although any number of blue LED lights could be used, in one aspect of the present invention, about three or four blue LED lights are equally spaced on the PCB shelf 114. Insects can be initially attracted from a long distance by the generated carbon dioxide gas.

Figure 5:
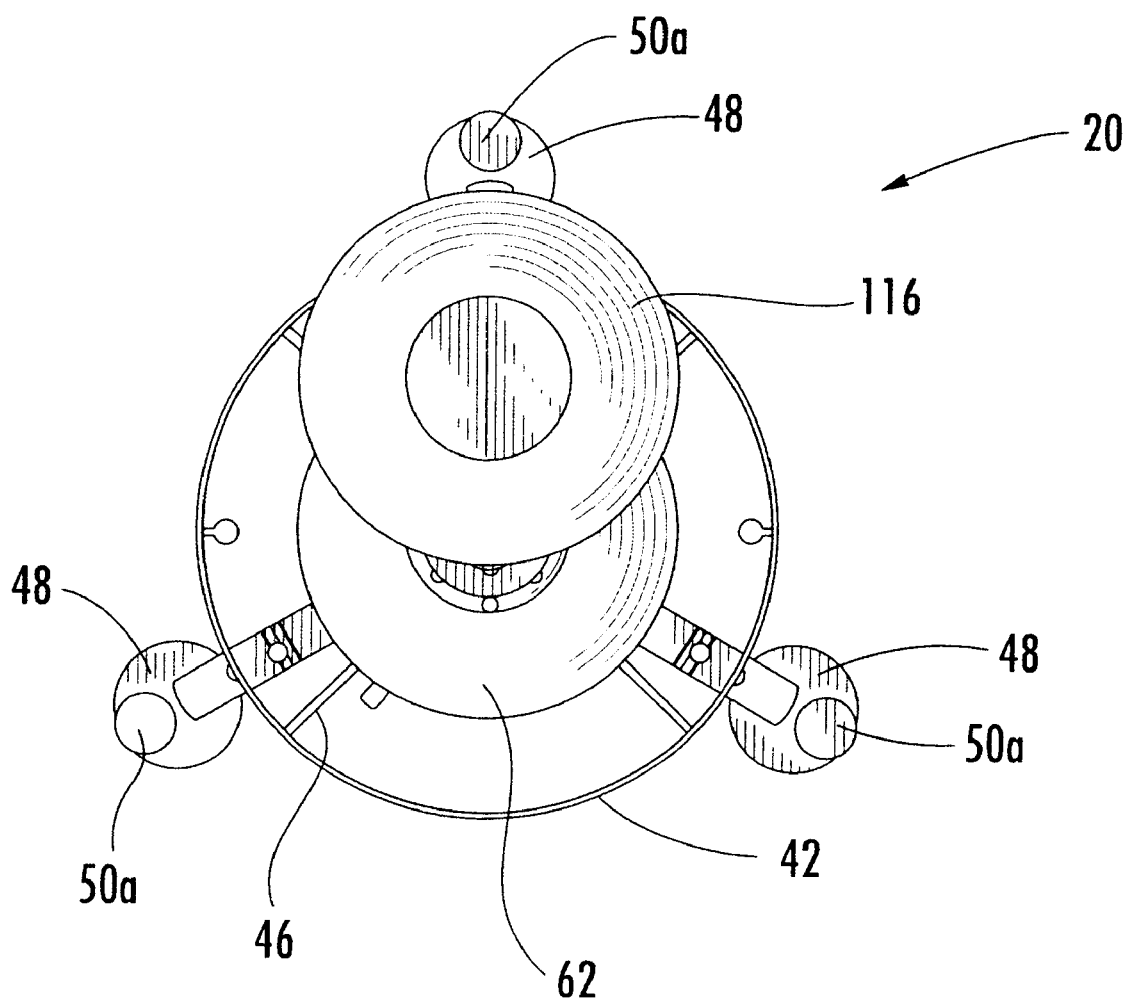
FIG. 5 is a top plan view of the insect trapping apparatus of the present invention.

FIG. 5 illustrates the general configuration in plan view of the insect trap barrel assembly 30 and its hood or helmet dome 116, relative to the position of the burner dome 62 of the burner barrel. It is evident that the insect trap barrel assembly is positioned offset from the burner barrel. The offset and curved cover over the top of the burner barrel are constructed to channel air out and down from the trap. Air reflecting from hard surfaces will cause unwanted turbulence and interference with the laminar flow of air of the outer barrel. The propane gas cylinder that is supported by the support frame 40 can be mounted offset from the trap barrel to provide greater weight stability on the entire insect trap apparatus 20.

Figure 16:
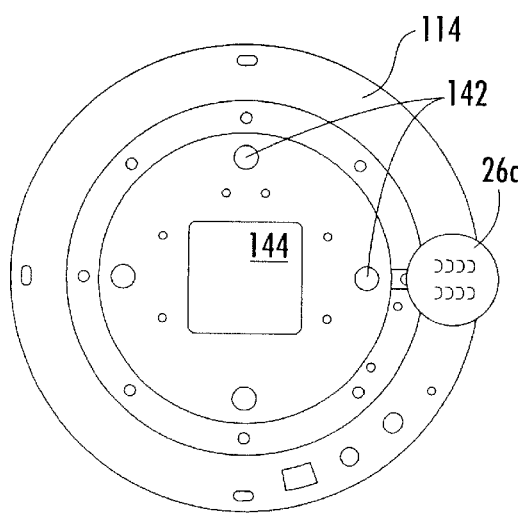
FIG. 16 is a plan view of the insect trap barrel assembly shown in FIGS. 14 and 15.

FIGS. 7, 14 and 16 illustrate that air is passed as a laminar air flow up the outer wall of the top barrel member forming the insect trap barrel assembly and through the annular inflow channel into the area defined by the helmet dome or hood. The air can be drawn through air orifices 142 in the shelf by the fan assembly and into a rectangular air opening 144 defined by the fan bracket, and then into the catch cup 36 in one aspect of the invention. Other designs for air flow in the insect trap barrel assembly 30 could be used as suggested by those skilled in the art.

In another aspect of the present invention, a heater panel 146 is secured against the interior wall of the top barrel member 112, such as by an adhesive, which could be a pressure sensitive silicon adhesive or other adhesive material, as known to those skilled in the art. In one aspect of the present invention, the heater panel 146 has a heater rating of about 120 watts operation and includes a thermostat 148 and associated electronic circuitry that controls temperature of the heater panel such that the wall surface formed by top barrel assembly of the insect trap barrel assembly 30 is heated at a temperature of about that of a warm blooded animal to create a heat signature that corresponds to the heat signature of a warm blooded animal to aid in attracting mosquitos and other insects to the proximity of the trap barrel assembly and into the laminar air flow extending along the exterior wall surface.

The heater panel can extend along a substantial portion of the vertical height of the barrel member. To reduce cooling effects created by the air flow drawn by the fan 138 into the insect trap barrel assembly 30, a heater panel liner 150 is biased against the heater panel and interior wall surface to force the heater panel against the wall. The heater panel liner 150 can be formed by a polyvinyl chloride (PVC) sheet or other similar materials known to those skilled in the art. In one aspect of the present invention, the heater panel liner 150 is about 1.6 millimeters thick, but could be other dimensions as suggested by those skilled in the art.

The lower portion of the insect trap barrel assembly 170 includes a door pusher ring 152 that includes a door pusher 154 and finger guard 156 formed as a steel disk mesh or similar material to prevent users from inserting their fingers within the lower portion of the top barrel assembly 30 and engaging the fan 138 and other electronic components. In one non-limiting example as an example only, the finger guard could be formed of steel mesh having a wire diameter of about 0.047 inches, and an open area of about 73.6%, three wires per inch, and a square mesh opening width of about 0.286.

The catch cup 36 is mounted on the lower portion of the barrel assembly as illustrated. The catch cup 36 includes a cup rim 160 having internal mounting lock pins 162 that engage with lock pin receiving slots 164 on the lower edge of the top barrel member 112 such that the catch cup can be forced upward onto the lower edge of the top barrel member. The lock pins 162 extend into the receiving slots 164. The cup rim is turned and the mounting lock pins 162 lock into the pin receiving slots 164.

A mesh cup 166 is mounted on the lower portion of the cup rim 160. A door support 170 is made from steel wire and contained within the mesh cup 166 and cup rim 160.

As the catch cup is mounted on the lower edge portion of the top barrel member, the door pusher 154 engages a flexible diaphragm 172 and the door disk 174 and pushes open the diaphragm as a double hinged trap door, but leaving the central area supported. Insects that are attracted into the insect trap barrel assembly pass down the barrel assembly through the trap door into the mesh cup 166. When the catch cup 36 is removed from the insect trap barrel assembly, the double hinged trap door springs back to close the mesh cup such that any insects that are still alive cannot escape. Water can be forced over the mesh cup, drowning any insects that are still alive. The mesh cup can then be removed and emptied.

It is evident that the present invention advantageously provides an attractant in the form of exhausted carbon dioxide ($CO_2$) gas and moisture that is not condensed by any counterflow and/or arcuately formed exhaust tubes. The blue LED lights and heat signature produced by the trap barrel assembly also provide an attractant once mosquitos and other insects are initially attracted by the hot carbon dioxide gas and moisture toward the apparatus. The catch cup of the present invention is advantageous and simple to use and provides for adequate insect removal without undue complexity and ripping of any fabric catch bags as in prior art insect trapping devices. The laminar air flow around the trap barrel assembly assists in guiding insects up into the insect trap barrel assembly and into the catch cup of the present invention.

This application is related to copending patent application entitled, "INSECT TRAPPING APPARATUS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An apparatus for trapping insects comprising:

a gas burner for burning a gas and generating hot carbon dioxide gas and moisture therefrom;

a vertically extending exhaust tube operative with the gas burner for discharging the hot carbon dioxide gas and moisture therefrom with minimal cooling and condensation of moisture; and an insect trap barrel assembly mounted on the exhaust tube and comprising
a cylindrically configured housing having an outer wall surface;
an air intake wall spaced from the outer wall surface and defining an annular configured air inflow channel;
a fan assembly mounted within the housing and communicating with the air inflow channel for drawing outside air into the housing and trapping insects that are drawn into the housing with the inflow of air, wherein the air intake wall is dimensioned and spaced from the outer wall surface such that the inflow of air into the inflow channel creates a substantially laminar flow of air along the outer wall surface of the housing and spaced from the exhaust tube to minimize cooling of any carbon dioxide gas and moisture exhausted therefrom; and
a heater panel positioned against an inner wall surface defined by the housing for heating the outer wall surface to a temperature corresponding to about a warm blooded animal for attracting insects.

2. An apparatus according to claim 1, and further comprising a catch cup removably mounted on the housing into which the inflow of air in the housing passes to trap insects therein.

3. An apparatus according to claim 2, wherein the catch cup includes a flexible diaphragm that opens when the catch cup is mounted on the housing to allow insects therein and closes when the catch cup is removed from the housing to trap insects therein.

4. An apparatus according to claim 1, wherein the gas comprises propane gas.

5. An apparatus according to claim 1, and further comprising a heater panel liner positioned against the heater panel and insulating the heater panel from any inflow of air into the housing to minimize cooling of the heater panel by the inflow of air.

6. An apparatus according to claim 1, wherein the exhaust tube includes an exhaust plate having vents through which the carbon dioxide gas is exhausted in a direction away from the insect trap barrel assembly.

7. An apparatus according to claim 1, and further comprising a ground engaging stand supporting a gas source and said insect trap barrel assembly as separate units and spaced from the ground.

* * * * *